United States Patent
Buza et al.

(12)

(10) Patent No.: US 9,126,543 B1
(45) Date of Patent: Sep. 8, 2015

(54) VEHICLE INTERIOR STRUCTURE

(71) Applicant: Nissan North America, Inc., Franklin, TN (US)

(72) Inventors: Jessica Buza, Riverview, MI (US);
Thomas Norton, Livonia, MI (US);
Thomas Mally, Beverly Hills, MI (US);
Hsiao-Tung Yang, Novi, MI (US);
Michael Eberlein, Plymouth, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/180,733

(22) Filed: Feb. 14, 2014

(51) Int. Cl.
*B60R 7/04* (2006.01)
*B60R 13/02* (2006.01)

(52) U.S. Cl.
CPC ..... *B60R 13/0206* (2013.01); *B60R 2013/0293* (2013.01)

(58) Field of Classification Search
CPC ...... B60N 3/101; B60N 3/12; B60R 13/0262; B60R 13/0206; B60R 7/04; B60R 13/02; B60R 2013/0287; B60R 2013/0293
USPC ............... 296/24.34, 136.07, 136.01, 136.08, 296/37.8
See application file for complete search history.

(56) References Cited

U.S. PATENT DOCUMENTS

| | | | |
|---|---|---|---|
| 7,631,917 B2 | 12/2009 | Kwolek | |
| 7,690,708 B2 | 4/2010 | Lota et al. | |
| 7,784,843 B2 * | 8/2010 | Lota et al. | 296/24.34 |
| 7,802,831 B2 | 9/2010 | Isayama et al. | |
| 7,854,457 B2 | 12/2010 | Tanner | |
| 8,066,313 B2 | 11/2011 | Carnevali | |
| 8,414,048 B1 * | 4/2013 | Kwolek | 296/24.34 |
| 8,474,214 B2 * | 7/2013 | Dawe et al. | 52/716.6 |
| 8,540,298 B2 | 9/2013 | Vasko et al. | |
| 2008/0001422 A1 * | 1/2008 | Kwolek | 296/24.34 |
| 2012/0200105 A1 * | 8/2012 | Vasko et al. | 296/24.34 |

* cited by examiner

*Primary Examiner* — Glenn Dayoan
*Assistant Examiner* — Sunsurraye Westbrook
(74) *Attorney, Agent, or Firm* — Global IP Counselors, LLP

(57) ABSTRACT

A vehicle interior structure includes a main body, a first side trim panel and a top finisher panel. The main body has a first side defining a plurality of first side attachment portions. The first side trim panel at least partially covers the first side of the main body and has a plurality of first panel attachment portions attached to the first side attachment portions of the main body. The first side trim panel also includes at least one first projection spaced apart from the first panel attachment portions and located adjacent to the upper end of the main body, the at least one first projection having an aperture. The top finisher panel covers the upper end of the main body and has at least one downwardly extending second projection that extends into the aperture of the at least one first projection retaining the first side trim panel in position.

19 Claims, 19 Drawing Sheets

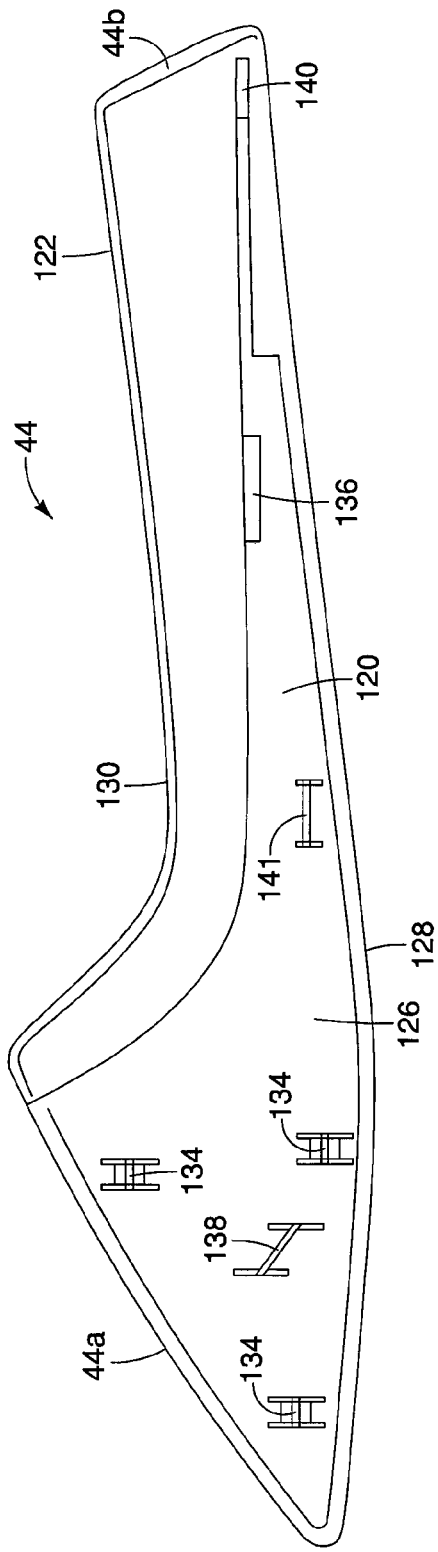
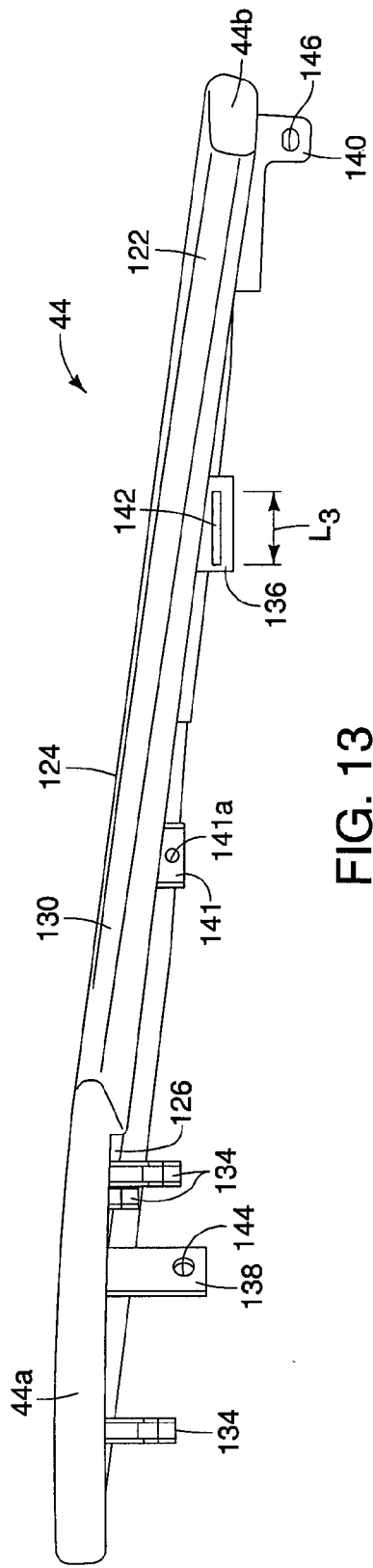
FIG. 12
FIG. 13

VEHICLE INTERIOR STRUCTURE

BACKGROUND

1. Field of the Invention

The present invention generally relates to a vehicle interior structure. More specifically, the present invention relates to vehicle interior structure that defines a center console assembly with side trim panels and a top finisher panel where the side trim panels attach to a main body of the center console assembly and the top finisher panel attaches to the side trim panels.

2. Background Information

Vehicle interior assemblies, such as a center console assembly, typically include at least one side trim panel and a top finisher panel where the side trim panel and the top finisher panel each have their own respective attachment structures that attach directly to a main body of the center console assembly.

SUMMARY

One object of the disclosure is to provide a center console assembly with a top finisher panel that restrains side trim panels against lateral movement away from a main body of the center console assembly.

Another object of the disclosure is to provide a center console assembly with a top finisher panel that attaches directly to side trim panels, where the side trim panels are directly attached to a main body of the center console assembly.

In view of the state of the known technology, one aspect of the disclosure is a vehicle interior structure that includes a main body, a first side trim panel and a top finisher panel. The main body has a first side defining a plurality of first side attachment portions and an upper end having a plurality of first top attachment portions. The first side trim panel at least partially covers the first side of the main body. The first side trim panel has a plurality of first panel attachment portions attached to the first side attachment portions of the main body. The first side trim panel also includes at least one first projection spaced apart from the first panel attachment portions and located adjacent to the upper end of the main body, the at least one first projection having an aperture. The top finisher panel covers the upper end of the main body and has a plurality of fourth attachment portions attached to first top attachment portions of the main body and at least one downwardly extending second projection that extends into the aperture of the at least one first projection retaining the first side trim panel in position relative to the main body.

BRIEF DESCRIPTION OF THE DRAWINGS

Referring now to the attached drawings which form a part of this original disclosure.

FIG. 12 is a side view the second side trim panel showing the attachment portions and the projection extending from the inboard surface of the second side trim panel in accordance with the one embodiment;

FIG. 13 is a top view of the second side trim panel showing the attachment portions and the projection extending from the inboard surface of the second side trim panel in accordance with the one embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
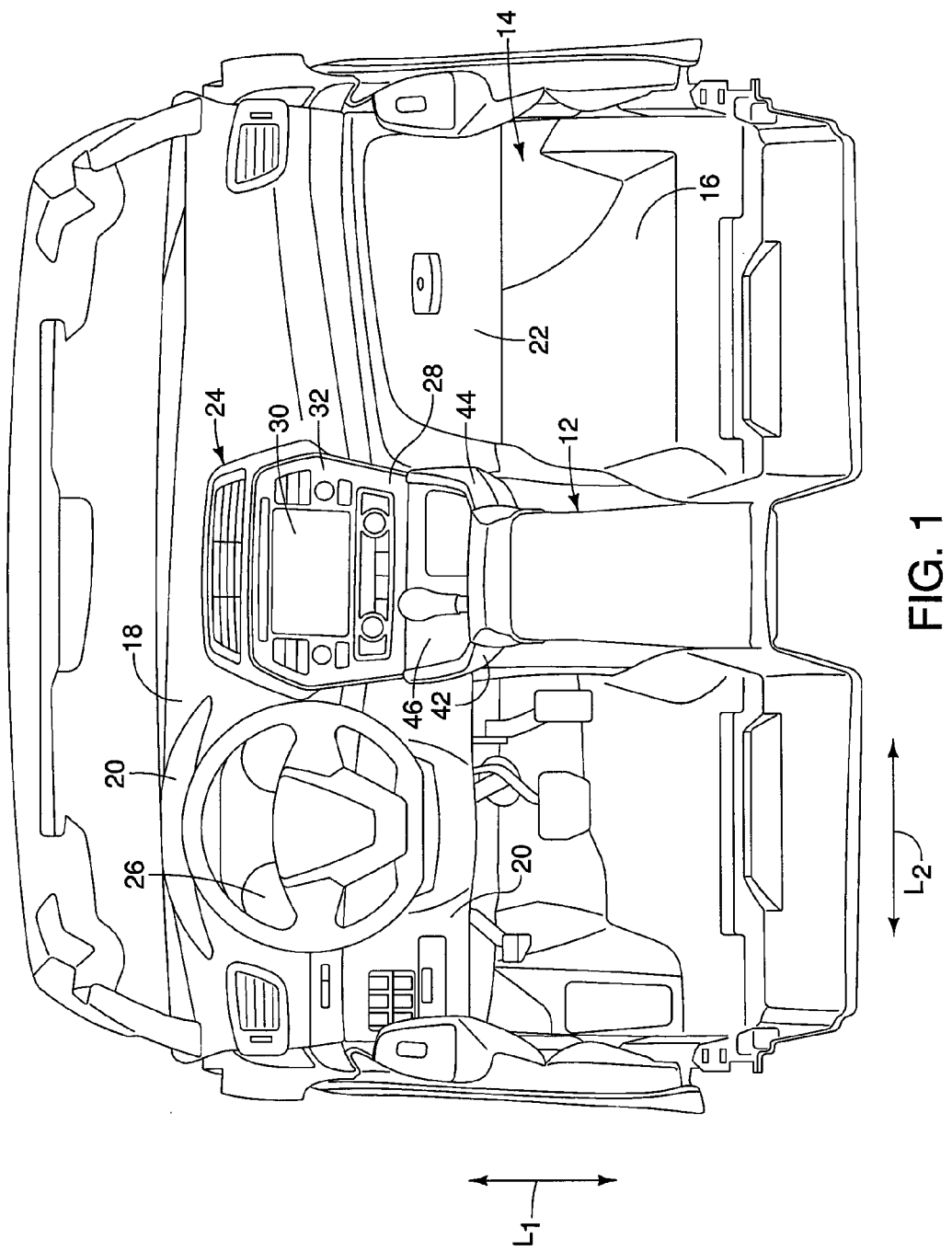
FIG. 1 is a plan view of a passenger compartment of a vehicle showing a center console assembly that includes a main body, first and second side trim panels and a top finisher panel in accordance with one embodiment.
Figure 2:
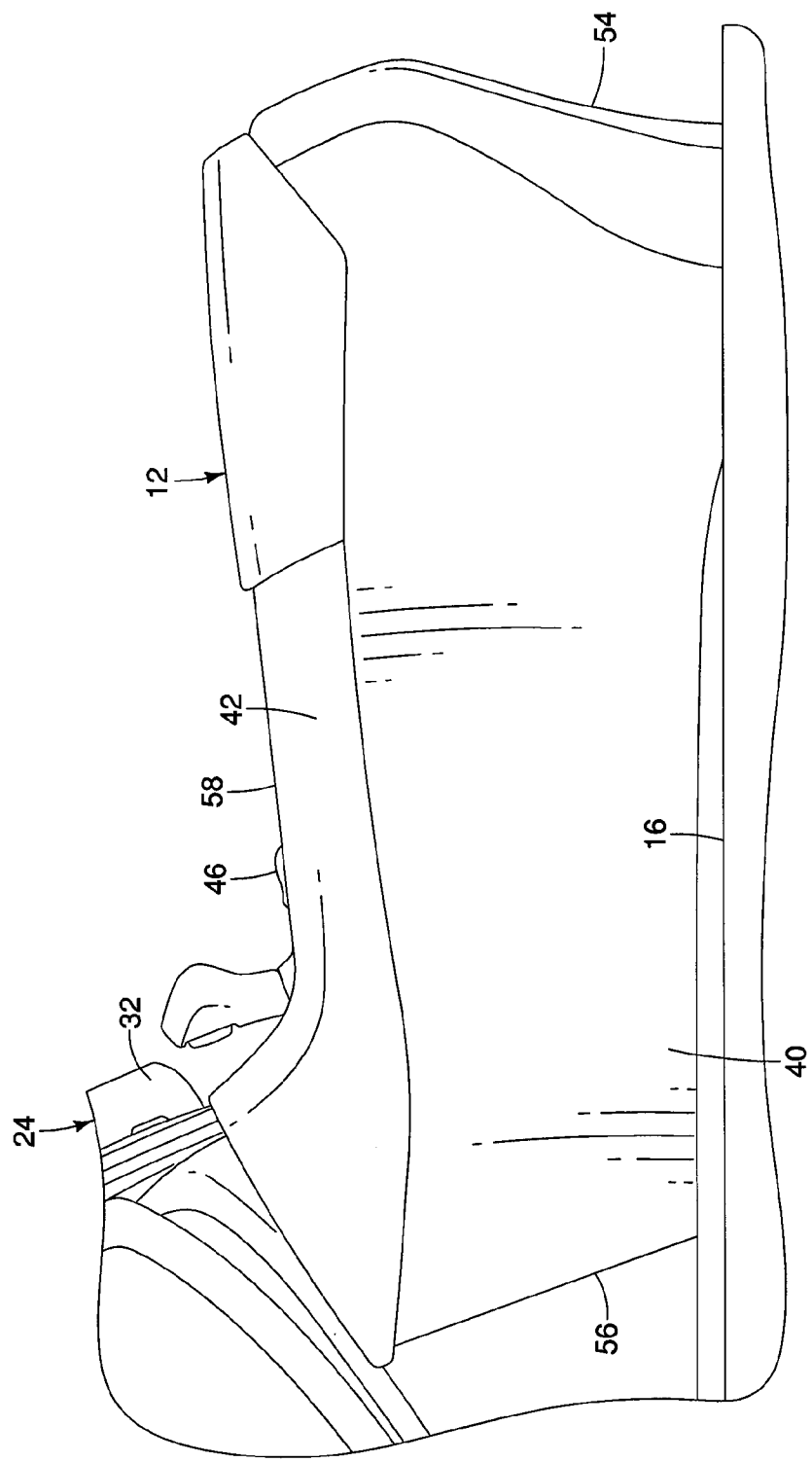
FIG. 2 is a side view of the center console assembly showing one of the side trim panels attached to the main body in accordance with the one embodiment.

Referring initially to FIGS. 1 and 2, a vehicle 10 having an interior structure 12 within a passenger compartment 14 of the vehicle 10 is illustrated in accordance with a first embodiment.

The passenger compartment 14 of the vehicle 10 includes, among other features, a floor 16 and an instrument panel 18. The floor 16 supports seats (not shown) and the interior structure 12. The instrument panel 18 includes a steering column supporting section 20, a storage compartment section 22 and a center stack assembly 24. The steering column supporting section 20 includes an instrument cluster 26. The center stack assembly 24 includes, among other features, an HVAC control section 28, an audio/visual control section 30 and a center stack trim panel 32.

Figure 3:
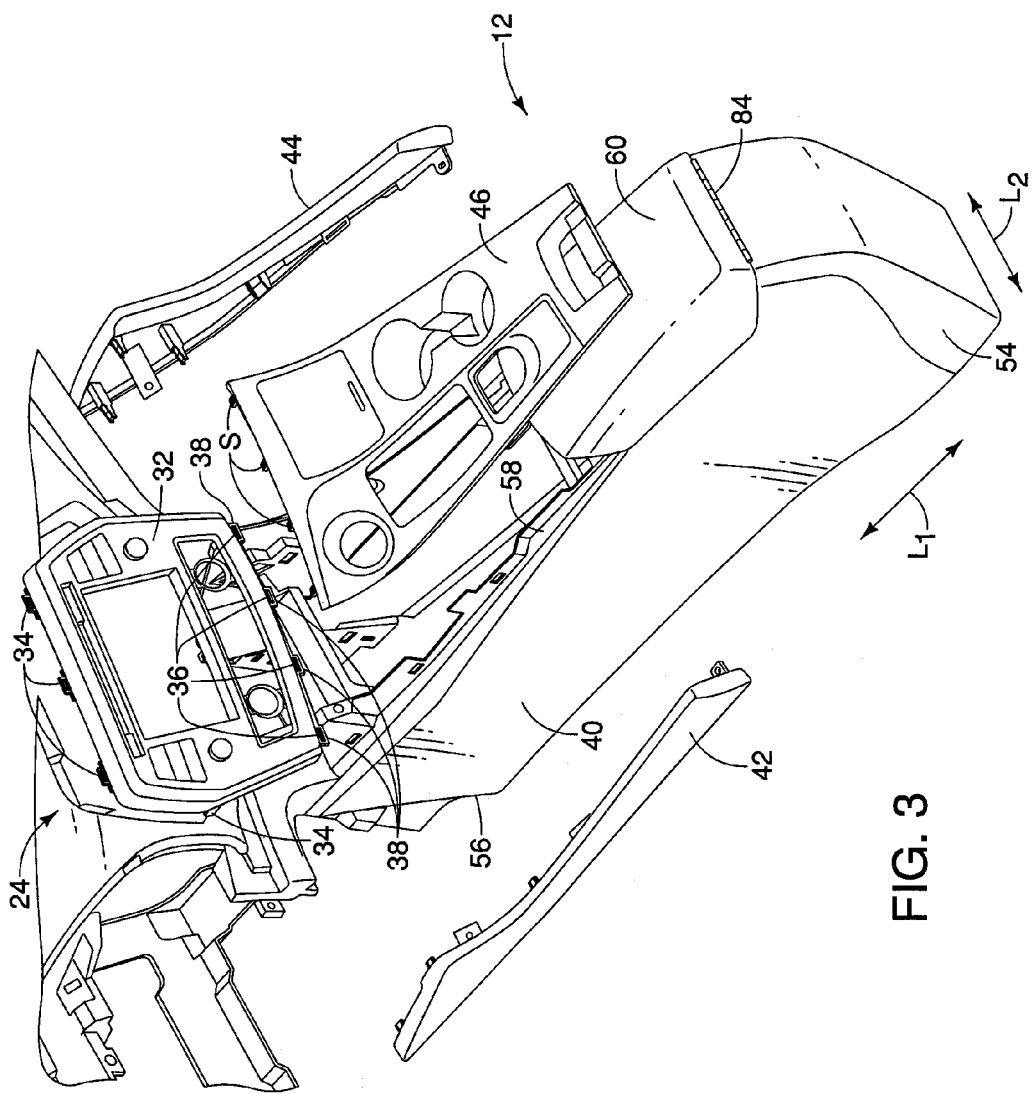
FIG. 3 is an exploded perspective view of the center console showing a center stack trim panel that attaches to an instrument panel, the main body, the first and second side trim panels and the top finisher panel in accordance with the one embodiment.

As shown in FIG. 3, the center stack trim panel 32 includes a plurality of snap fitting projections 34 and a plurality of attachment projections 36 with apertures 38 that receive snap-fitting projections S of the interior structure 12, as is described in greater detail below.

A description of the interior structure 12 is now provided with initial reference to FIGS. 1 and 3. The interior structure 12 is basically a center console assembly of the vehicle 10, located between the front seats (not shown) of the vehicle 10 within the passenger compartment 14. As shown in FIG. 3, the interior structure 12 basically includes, among other elements, a main body 40, a first side trim panel 42, a second side trim panel 44 and a top finisher panel 46.

As shown in FIGS. 4-7, the main body 40 is basically a supporting frame of the interior structure 12. The main body 40 can include a rigid skeletal box-like frame covered with a decorative material, such as leather, simulated leather, wood, simulated wood, or have decorative textures formed on exposed surfaces of the skeletal box-like frame. The main body 40 basically includes a first side 50, a second side 52, a rear end 54, a front end 56, an upper end 58, a storage compartment (not shown), a hinged storage compartment cover 60 that covers the storage compartment, and at least one cross-brace 62. The main body 40 includes attachment flanges (not shown) at lower ends of each of the first side 50 and second side 52 that receive mechanical fasteners that fixedly attach the main body 40 to the floor 16 of the vehicle 10 in a conventional manner. Since mechanical fasteners and attachment of center console assemblies to the floor of a vehicle are conventional features, further description is omitted for the sake of brevity.

Figure 4:
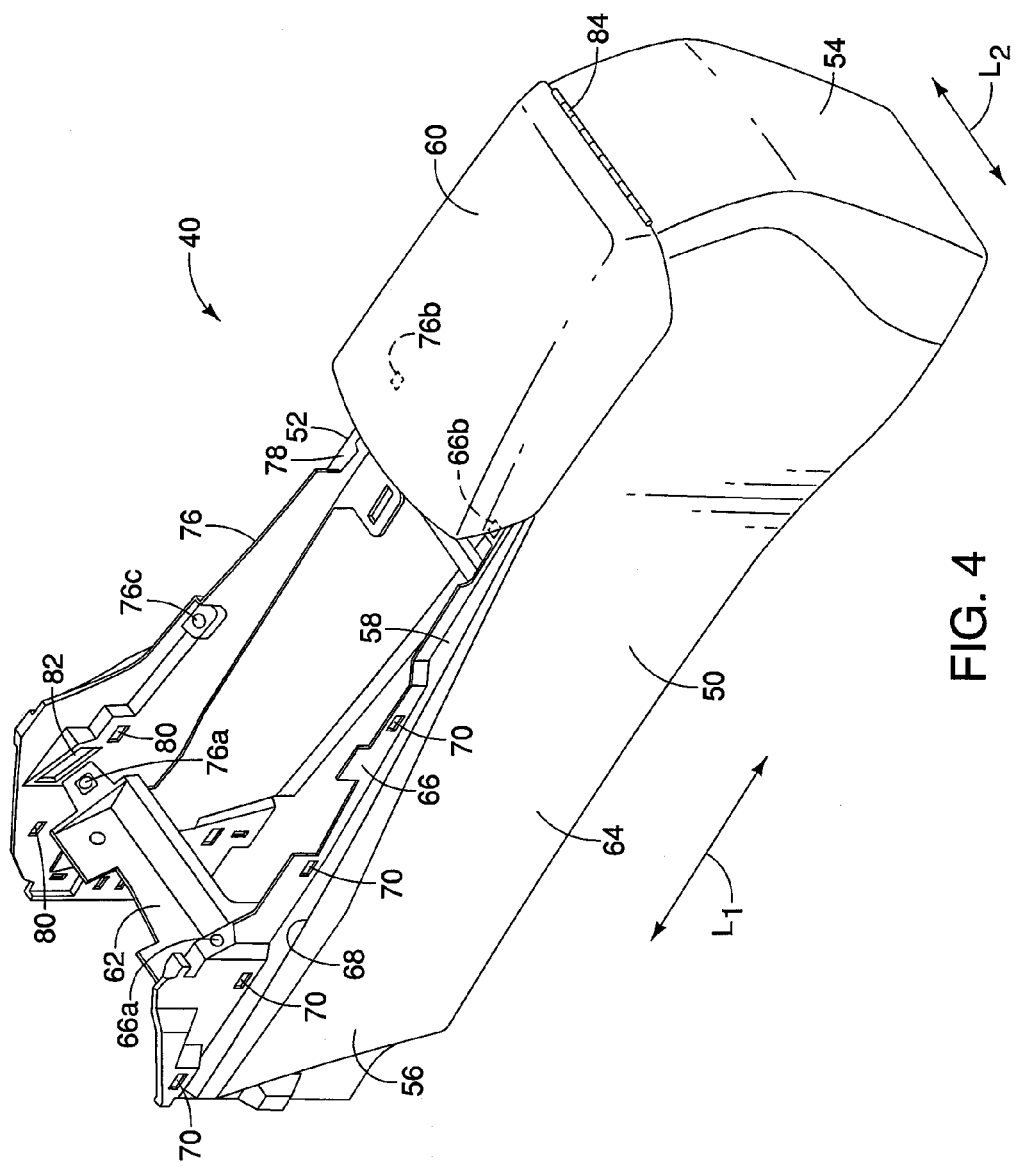
FIG. 4 is a perspective view of the main body of the center console assembly with the first and second side trim panels and the top finisher panel removed in accordance with the one embodiment.
Figure 5:
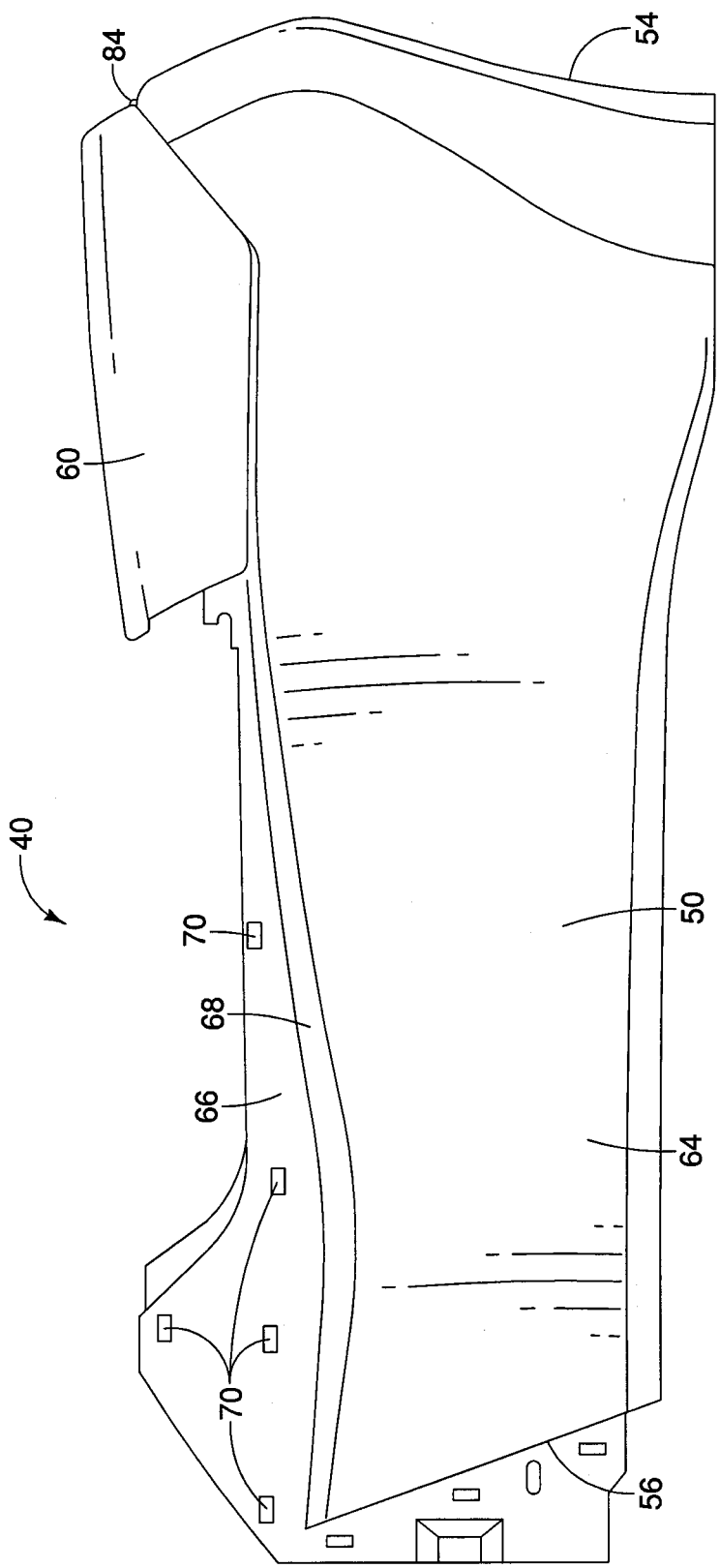
FIG. 5 is a side view of the main body showing an upper flange of a first side of the main body in accordance with the one embodiment.
Figure 7:
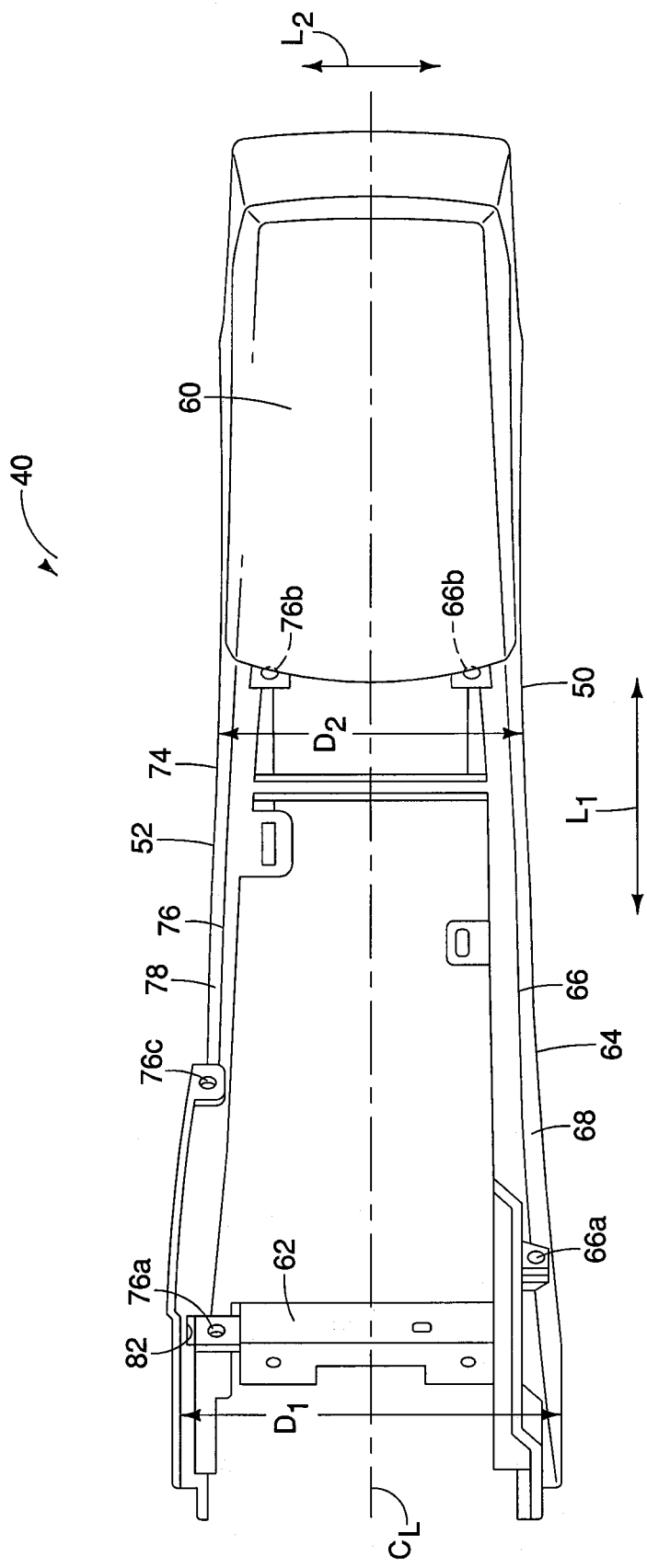
FIG. 7 is a top view of the main body showing various attachment areas in accordance with the one embodiment.

As shown in FIGS. 4 and 5, the first side 50 of the main body 40 includes a main surface 64, an upper flange 66 and a transition portion 68 that extends in a vehicle longitudinal direction $L_1$ along the first side 50, between the main surface 64 and the upper flange 66. The main surface 64 is vertically oriented and extends from the rear end 54 to the front end 56. The main surface 64 can be planar, but in the depicted embodiment includes surface contours such that the main surface 64 is not planar. Rather, as shown in FIG. 7, the main surface 64 includes a slight curvature such that proximate the front end 56 of the main body 40, the first side 50 and the second side 52 are spaced apart from one another by a first distance $D_1$. Proximate the rear end 58 of the main body 40 (adjacent to a front end of the storage compartment cover 60), the first side 50 and the second side 52 are spaced apart from one another by a second distance $D_2$ that is less than the first distance $D_1$.

As is shown in FIG. 7, the main surface 64 is located outboard of the upper flange 66 relative to a center line $C_L$ of the vehicle 10 in a vehicle lateral direction $L_2$. The transition portion 68 defines an offset along the first side 50 between the upper flange 66 and the main surface 64. As shown in FIG. 5, the upper flange 66 of the first side 50 of the main body 40 includes a plurality of first side attachment portions 70 that are basically apertures or slots that receive snap-fitting projections of the first side trim panel 42, as described in greater detail below.

The first side attachment portions 70 are spaced apart from one another in order to define a predetermined pattern corresponding to spacing between projections (described below) of the first side trim panel 42. The upper flange 66 is generally vertically oriented, extending upward from the transition portion 68. Hence, the slots or apertures that define the first side attachment portions 70 are horizontally oriented extending from an outboard surface of the upper flange 66 to an inboard surface of the upper flange 66. As shown in FIG. 7, the upper end of the upper flange 66 also includes a plurality of first top attachment portions defined by a first fastener receiving aperture 66a and a second fastener receiving aperture 66b. As shown in FIG. 5, the first side 50 includes further attachment slots at the front end 56 that are provided for attachment to further trim panels located beneath the instrument panel 18 whose description is omitted for the sake of brevity.

Figure 6:
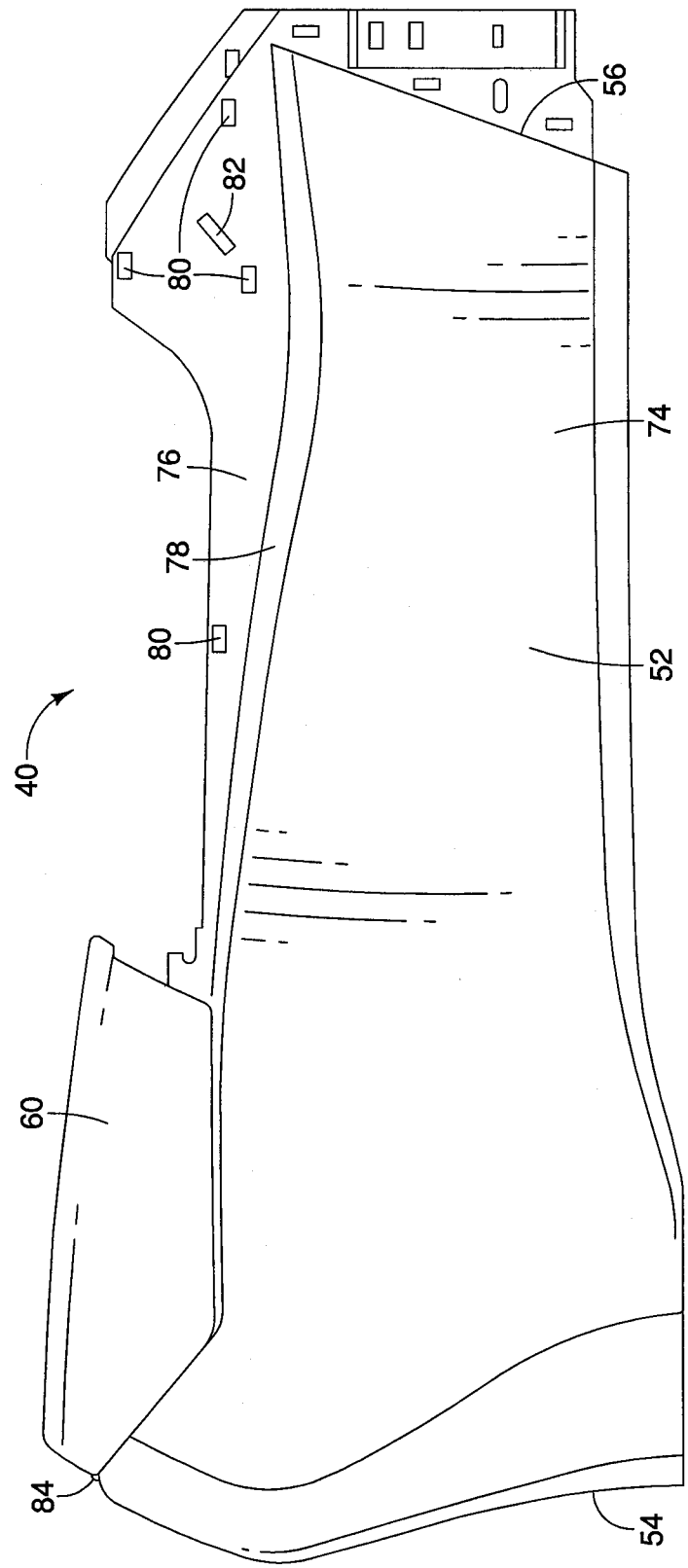
FIG. 6 is another side view of the main body showing an upper flange of a second side of the main body in accordance with the one embodiment.

As shown in FIGS. 6 and 7, the second side 52 of the main body 40 includes a main surface 74, an upper flange 76 and a transition portion 78 that extends in the vehicle longitudinal direction $L_1$ along the second side 52, between the main surface 74 and the upper flange 76. As is shown in FIG. 7, the main surface 74 is located outboard of the upper flange 76 relative to the center line $C_L$ of the vehicle 10 in the vehicle lateral direction $L_2$. The transition portion 78 defines an offset in the second side 52 between the upper flange 76 and the main surface 74. As shown in FIG. 6, the upper flange 76 of the second side 52 of the main body 40 includes a plurality of second side attachment portions 80 that are basically a series of apertures or slots that receive snap-fitting projections of the second side trim panel 44, as described in greater detail below. The second side attachment portions 80 are spaced apart from one another defining a predetermined pattern corresponding to spacing between the projections (described below) of the second side trim panel 44. The upper flange 76 is generally vertically oriented, extending upward from the transition portion 78. Hence, the slots or apertures that define the second side attachment portions 80 are horizontally oriented extending from an outboard surface of the upper flange 76 to an inboard surface of the upper flange 76. The upper flange 76 is also provided with an inclined slot 82 that extends from the outboard surface of the upper flange 76 to the inboard surface of the upper flange 76. The inclined slot 82 is located adjacent to the cross brace 62 and is open to an area immediately above the cross brace 62. As shown in FIG. 6, the second side 52 includes further attachment slots at the front end 56 that are provide for attachment to further trim panels located beneath the instrument panel 18 whose description is omitted for the sake of brevity.

As shown in FIG. 7, the upper end of the upper flange 76 also includes a plurality of fourth attachment portions defined by a first fastener receiving aperture 76a, a second fastener receiving aperture 76b and a third fastener receiving aperture 76c. The first fastener receiving aperture 76a can be formed on a portion of the cross brace 62 adjacent to the inclined slot 82, or alternatively can be formed on an area of the upper flange 76.

The storage compartment cover 60 is a conventional cover that is pivotally attached to the rear end 54 of the main body 40 via a hinge 84 that covers the storage compartment (not shown). Hence, the storage compartment cover 60 is movable from a closed position to an open position (not shown) exposing the storage compartment. Since storage compartment covers and storage compartments of center consoles are conventional features, further description is omitted for the sake of brevity.

As shown in FIG. 7, the cross-brace 62 is rigidly fixed to the first side 50 and the second side 52 of the main body 40 proximate the front end 56 of the main body 40. The cross-brace 62 can be integrally formed with the first side 50 and the second side 52 defining the skeletal box-like structure of the main body 40, defining a single, unitary, monolithic, a one piece element. The cross-brace 62 in the depicted embodiment is formed with the first side 50 and the second side 52 of the main body 40 during a single molding process. More specifically, the cross-brace 62 extends from the inboard surface of the first side 50 to the inboard surface of the second side 52. Alternatively, the cross-brace 62 can be a separate element that is fixed to the first side 50 and the second side 52 by mechanical fasteners. In the depicted embodiment, the cross-brace 62 includes the first fastener receiving aperture 76a.

Figure 8:
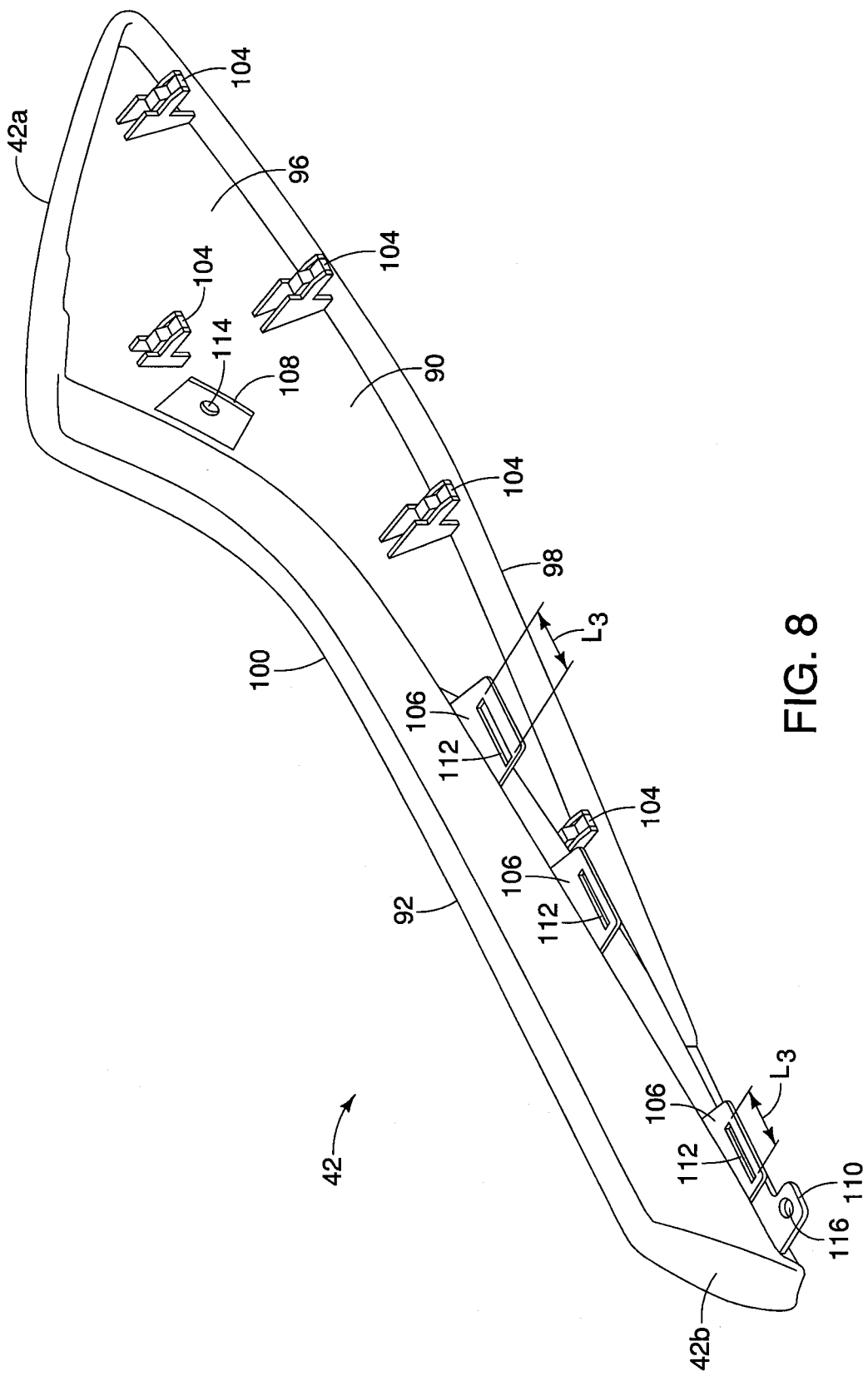
FIG. 8 is a perspective view of an inboard surface of the first side trim panel showing attachment portions and projections extending from the inboard surface in accordance with the one embodiment.
Figure 9:
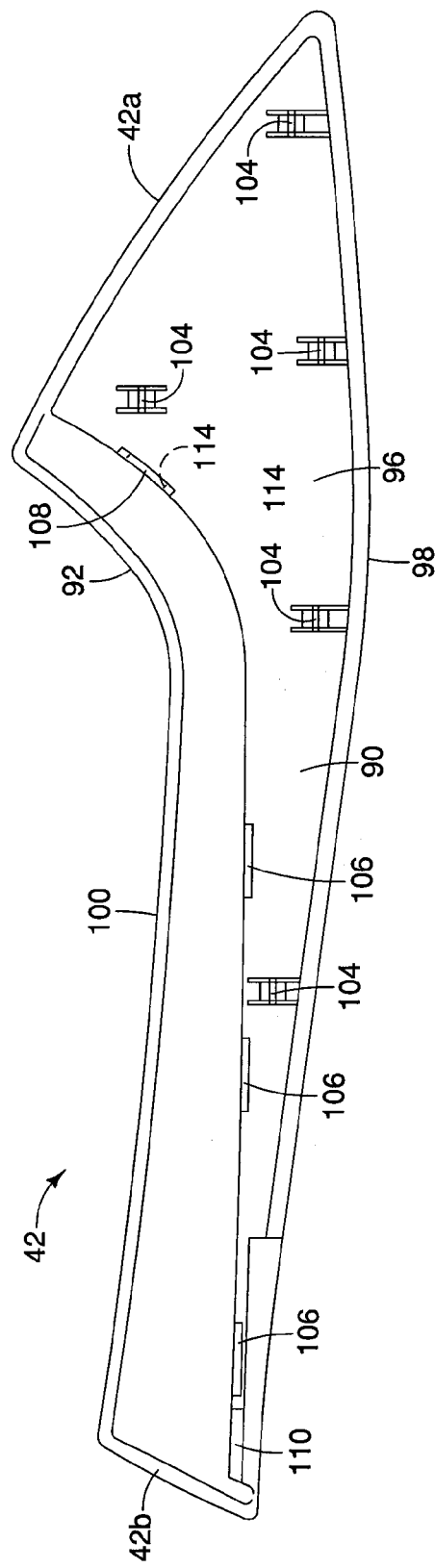
FIG. 9 is a side view the first side trim panel showing the attachment portions and projections extending from the inboard surface of the first side trim panel in accordance with the one embodiment.
Figure 10:
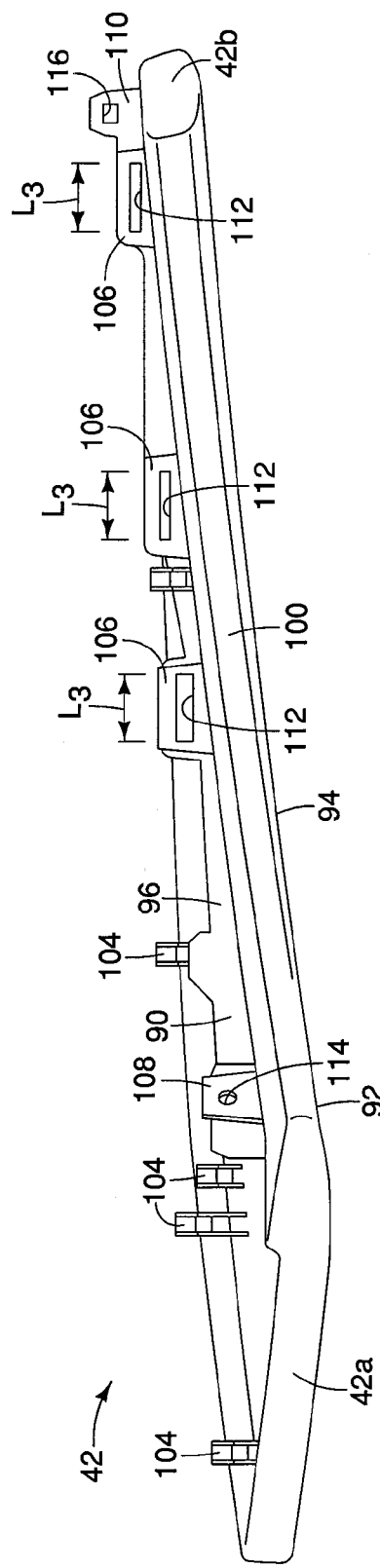
FIG. 10 is a top view of the first side trim panel showing the attachment portions and projections extending from the inboard surface of the first side trim panel in accordance with the one embodiment.

The first side trim panel 42 is now described with specific reference to FIGS. 8-10. The first side trim panel 42 includes a rigid inner portion 90 and a flexible outer portion 92 that define an outboard surface 94, an inboard surface 96, a lower edge 98 and an upper edge 100. The first side trim panel 42 further has a front end 42a and a rear end 42b. The flexible outer portion 92 is fixedly attached to the rigid inner portion 90, covering a majority of the rigid inner portion 90. The outboard surface 94 is basically defined on the flexible outer portion 92. The flexible outer portion 92 can be leather, a leather-like material, a textile material, a wood veneer, or other decorative material. The inboard surface 96 is basically defined by the rigid inner portion 90, with portions of the flexible outer portion 92 overlapping on to an inboard side of the rigid inner portion 90, thereby at least partially defining the inboard surface 96 of the first side trim panel 42.

The rigid inner portion 90 can be made of a plastic material, polymer based material or other suitable rigid material. The rigid inner portion 90 includes a plurality of first panel attachment portions 104, at least one first projection 106, a front attachment flange 108 and a rear attachment flange 110. The first panel attachment portions 104 include snap fitting projections. The at least one first projection 106 is spaced apart from the first panel attachment portions 104 and located adjacent to the upper end 58 of the main body 40 with the rigid inner portion 90 installed to the main body 40. The at least one first projection 106 has a slot 112. In the depicted embodiment, the at least one first projection 106 includes a plurality of first projections 106, each having a corresponding slot 112. The slots 112 have an overall length $L_3$, as shown in FIGS. 8 and 10.

The front attachment flange 108 also includes an aperture 114. The rear attachment flange 110 includes an aperture 116.

The rigid inner portion 90, the first panel attachment portion 104, the first projections 106, the front attachment flange 108 and the rear attachment flange 110 are all integrally formed as a one piece unitary monolithic element. Further as shown in FIGS. 8-10, the first projections 106 extend in directions that are parallel to one another and substantially perpendicular to the inboard surface 96 of the rigid inner portion 90 of the first side trim panel 42.

Figure 11:
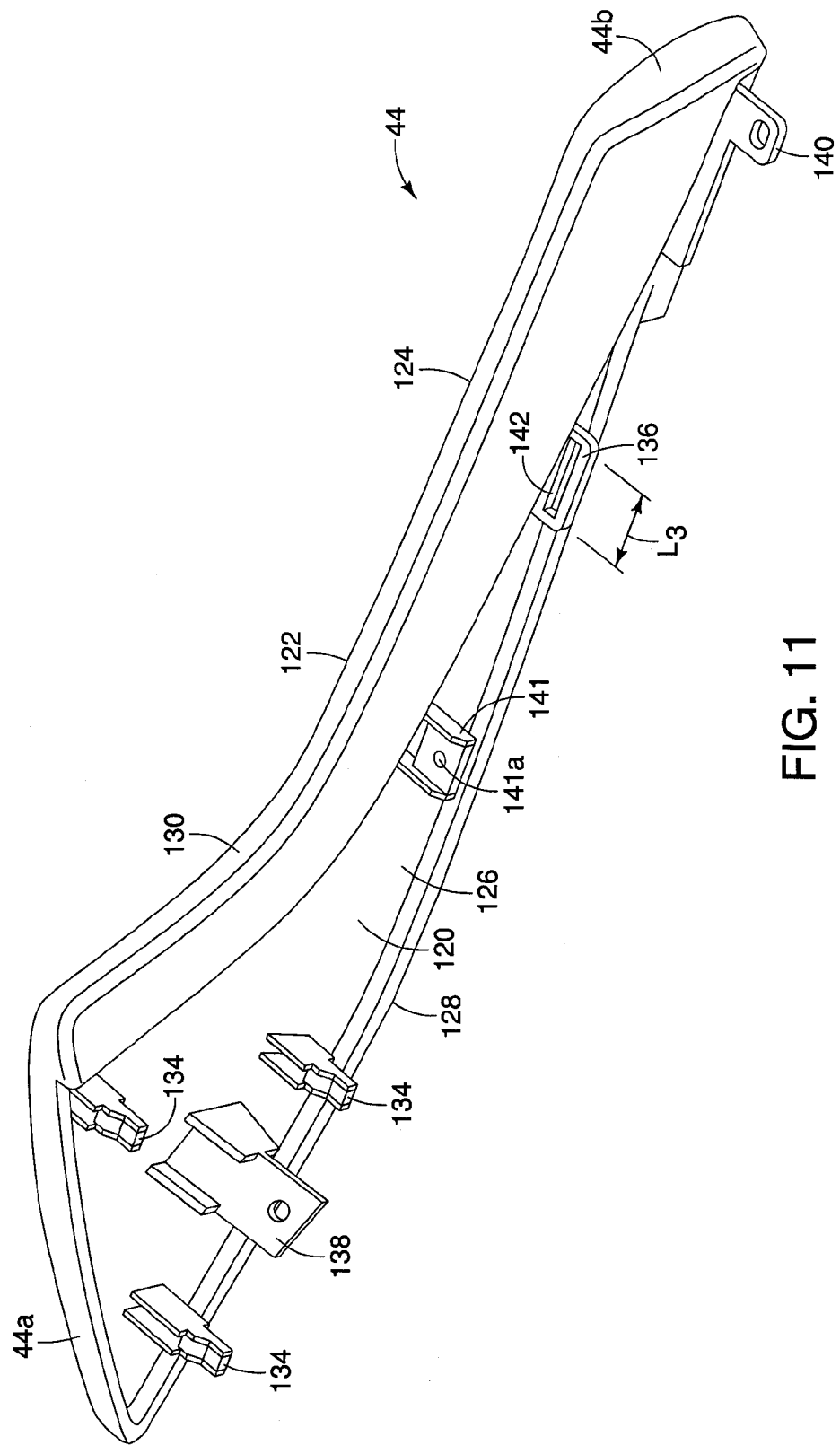
FIG. 11 is a perspective view of an inboard surface of the second side trim panel showing attachment portions and a projection extending from the inboard surface in accordance with the one embodiment.

The second side trim panel 44 is now described with specific reference to FIGS. 11-13. The second side trim panel 44 includes a rigid inner portion 120 and a flexible outer portion 122 that define an outboard surface 124, an inboard surface 126, a lower edge 128 and an upper edge 130. The second side trim panel 44 further has a front end 44a and a rear end 44b. The flexible outer portion 122 is fixedly attached to the rigid inner portion 120, covering a majority of the rigid inner portion 120. The outboard surface 124 is basically defined on the flexible outer portion 122. The flexible outer portion 122 can be leather, a leather-like material, a textile material, a wood veneer, or other decorative material. The inboard surface 126 is basically defined by the rigid inner portion 120, with portions of the flexible outer portion 122 overlapping on to an inboard side of the rigid inner portion 120, thereby at least partially defining the inboard surface 126 of the second side trim panel 44.

Similar to the first side trim panel 42, the rigid inner portion 120 of the second side trim panel 44 can be made of a plastic material, polymer based material or other suitable rigid material. The rigid inner portion 120 includes a plurality of second panel attachment portions 134, a projection 136, a front attachment flange 138, a rear attachment flange 140 and a mid-attachment flange 141. The second panel attachment portions 134 include snap fitting projections. The projection 136 is spaced apart from the second panel attachment portions 134 and located adjacent to the upper end 58 of the main body 40 with the rigid inner portion 120 installed to the main body 40. The projection 136 has a slot 142. In the depicted embodiment, there is only one projection 136. However alternatively, a plurality of first projections 106 each having a corresponding slot 142 can be provided on the second side trim panel 44. As shown in FIGS. 11 and 13, the slot 142 has an overall length $L_3$ that is the same as the slots 112 of the first side trim panel 42.

The front attachment flange 138 also includes an aperture 144. The rear attachment flange 140 includes an aperture 146. The mid-attachment flange 141 includes an aperture 141a.

The rigid inner portion 120, the second panel attachment portions 134, the projection 136, the front attachment flange 138, the rear attachment flange 140 and the mid-attachment flange 142 are all integrally formed as a one piece unitary monolithic element.

As shown in FIGS. 11-13, the first projection 136 extends in a direction that substantially perpendicular to the inboard surface 126 of the rigid inner portion 120 of the second side trim panel 44. In the depicted embodiment only a single first projection 136 is included on the rigid inner portion 120 of the second side trim panel 44. However, it should be understood from the drawings and the description herein that a plurality of the first projections 136 can be included on the rigid inner portion 120.

Figure 14:
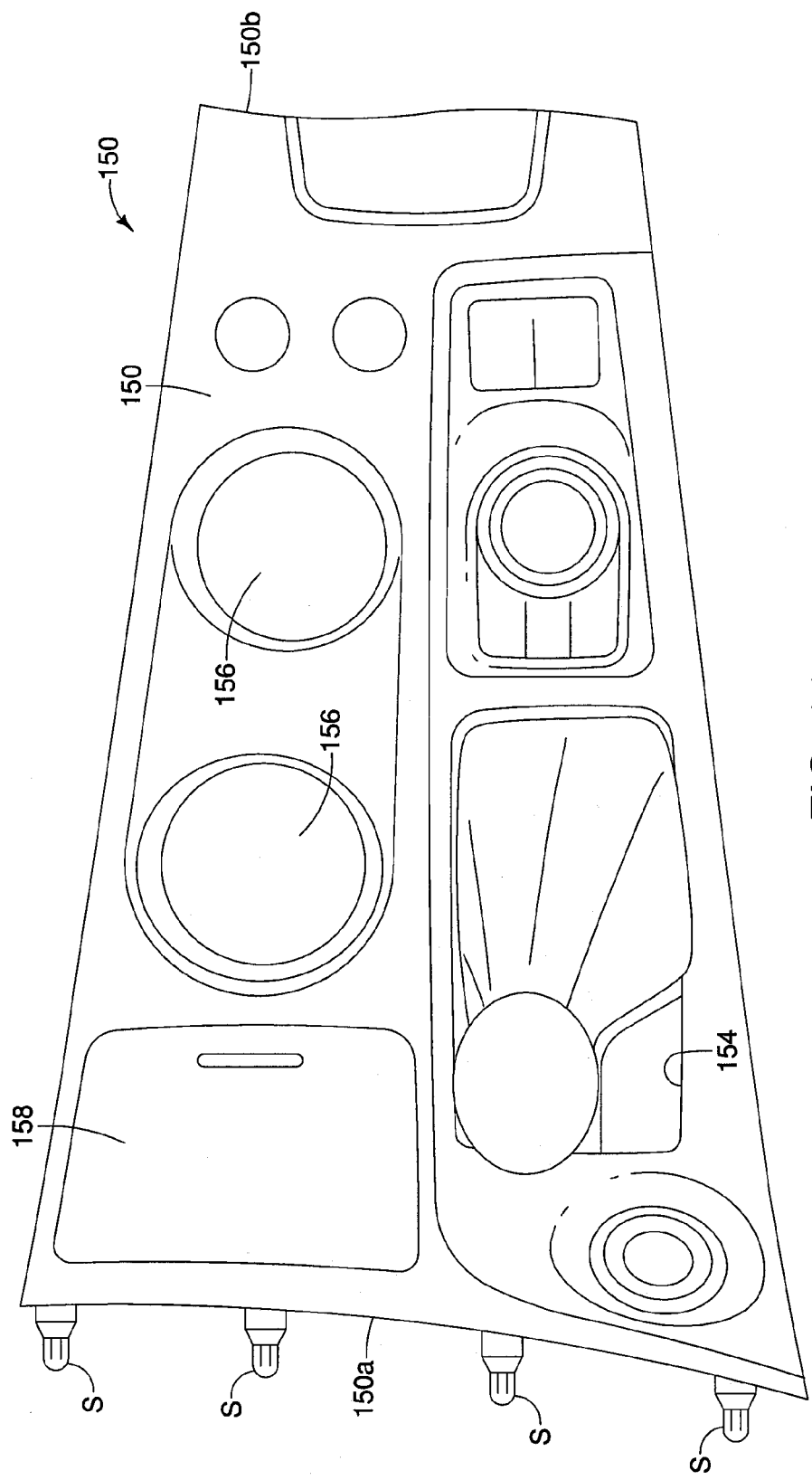
FIG. 14 is a top view of the top finisher panel showing snap fitting projections that extend from a front end of the top finisher panel in accordance with the one embodiment.
Figure 15:
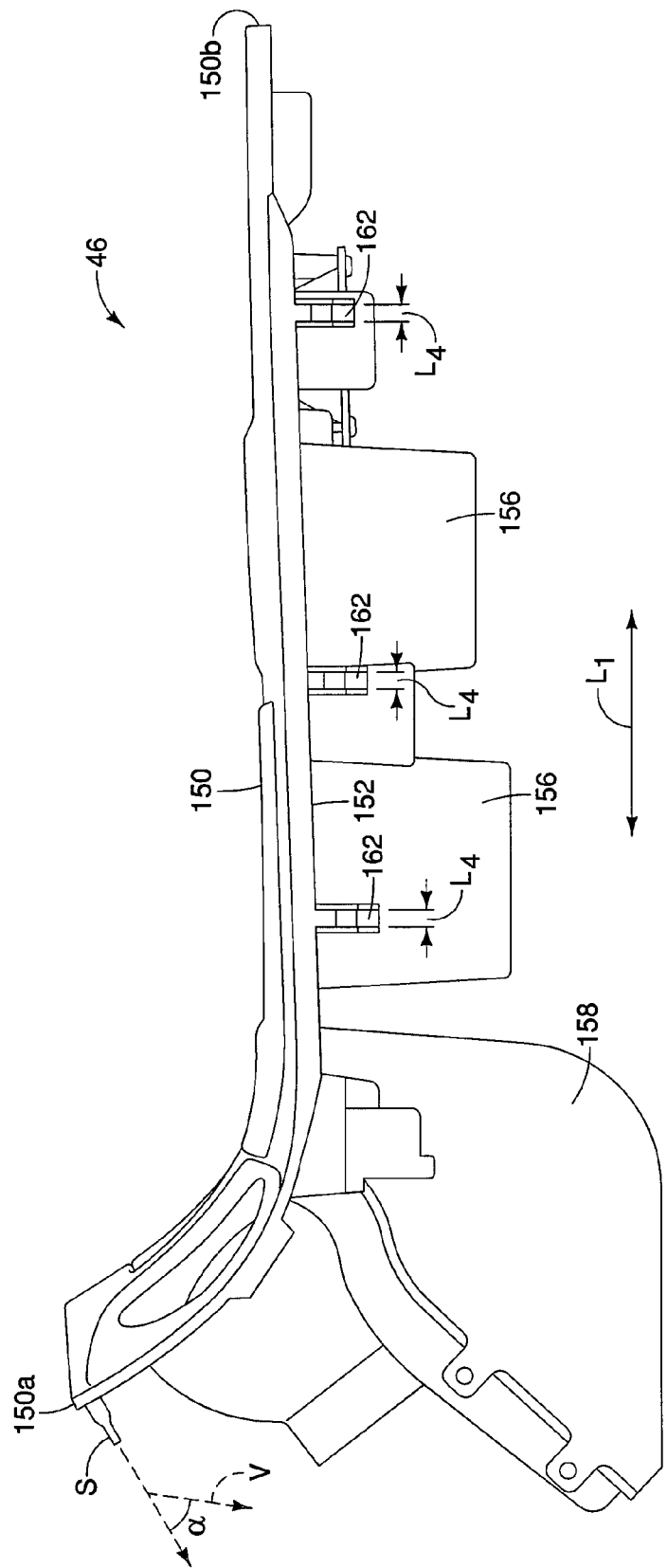
FIG. 15 is a side view of the top finisher panel showing the snap fitting projections that extend from the front end and first side snap-fitting projections that extend from a lower surface of the top finisher panel in accordance with the one embodiment.
Figure 16:
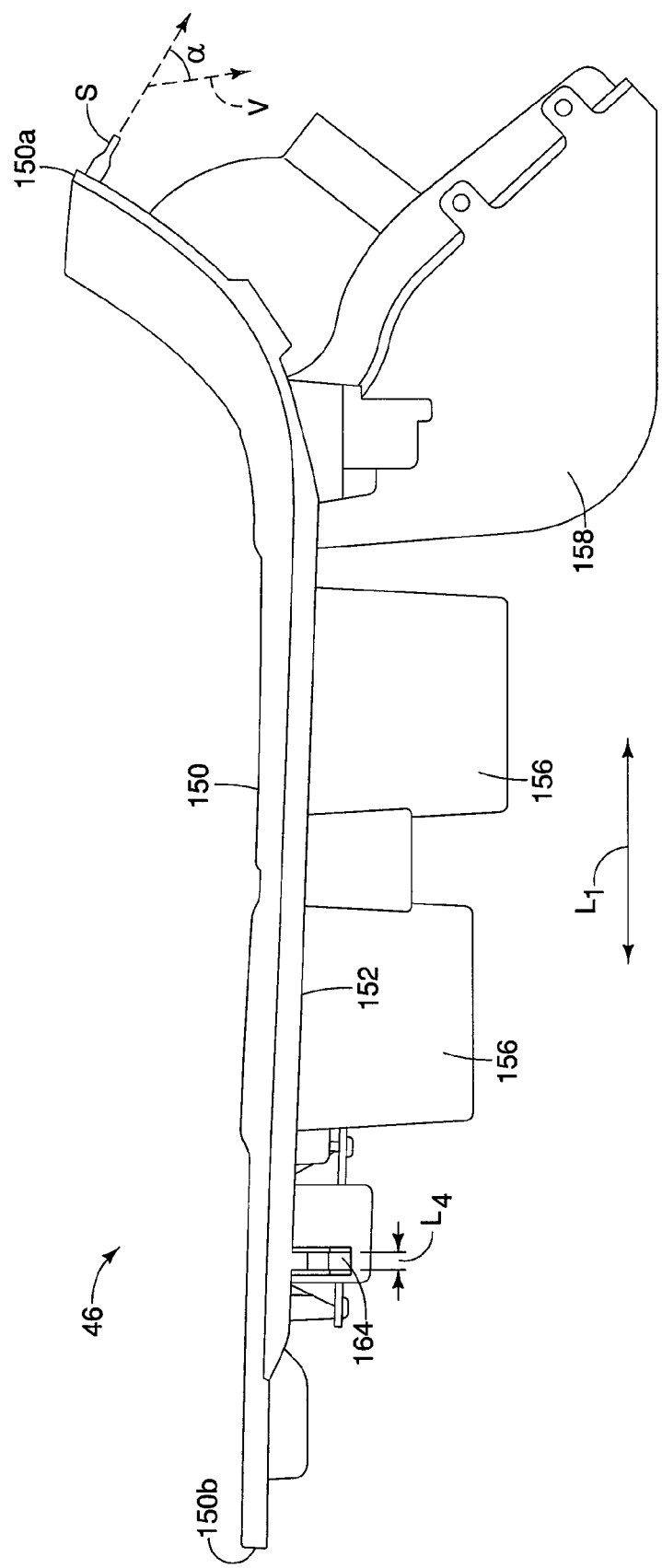
FIG. 16 is another side view of the top finisher panel showing the snap fitting projections that extend from the front end and a second side snap-fitting projection that extends from a lower surface of the top finisher panel in accordance with the one embodiment.

A description of the top finisher panel 46 is now provided with specific reference to FIGS. 14-16. The top finisher panel 46 basically includes an upper surface 150, a lower surface 152, a shifter receiving opening 154, a pair of cup holders 156, a storage compartment 158 and other conventional features whose description is omitted for the sake of brevity.

The upper surface 150 is shaped and contoured to complement the overall appearance of the interior assembly 12 (the center console). For example, the upper surface 150 can be provided with a cosmetic appearance, such as wood, simulated wood, a textured finish, or other desirable appearance. A front end 150a of the upper surface 150 is wider than a rear end 150b of the upper surface 150, as shown in FIG. 14 such that upon installation, the top finisher panel 46 covers the upper end 58 of the main body 40 of the interior assembly 12, and fits flush between the first side trim panel 42 and second side trim panel 44, as described below. The front end 15a is also contoured with a curved, non-symmetrical overall shape in order to mate with a lower end of the center stack trim panel 32. A majority of the top finisher panel 46 is planar or flat. However, a front portion of the top finisher panel 46 includes a curvature such that the front end 150a extends upward away from the remainder of the top finisher panel 46.

The lower surface 152 of the top finisher panel 46 includes the snap-fitting projections S, a plurality of first side snap-fitting projections 162 (FIG. 15) and a second side snap fitting projection 164 (FIG. 16). The pair of cup holders 156 and the storage compartment 158 are supported on the lower surface 152 and extend downward therefrom.

The first side snap-fitting projections 162 and the second side snap fitting projection 164 extend downward from the lower surface 152 and are perpendicular to the adjacent areas of the lower surface 152. The first side snap-fitting projections 162 and the second side snap fitting projection 164 have a width $L_4$ measured in the vehicle longitudinal direction $L_1$. The width $L_4$ of the first and second side snap-fitting projections 162 is less than the overall length $L_3$ of the slots 112 of the first projections 106 and the slot 142 of the second projections 136 of the first and second side trim panels 42 and 44.

As mentioned above, the front end 150a is extends upward and away from the remainder of the top finisher panel 46 towards a front of the interior assembly 12. The snap-fitting projections S extend from the lower surface 152 adjacent to the front end 150a. The snap-fitting projections S extend in a direction that is approximately perpendicular to the adjacent portion of the lower surface 152, but due to the curvature of the front end 150a of the top finisher panel 46, the snap-fitting projection S are inclined with respect to a vertical line V by an angle α, as indicated in FIG. 15. The angle α can be any angle between 35 and 70 degrees. However, in the depicted embodiment, the angle α is 50 degrees with respect to the vertical direction V.

Figure 17:
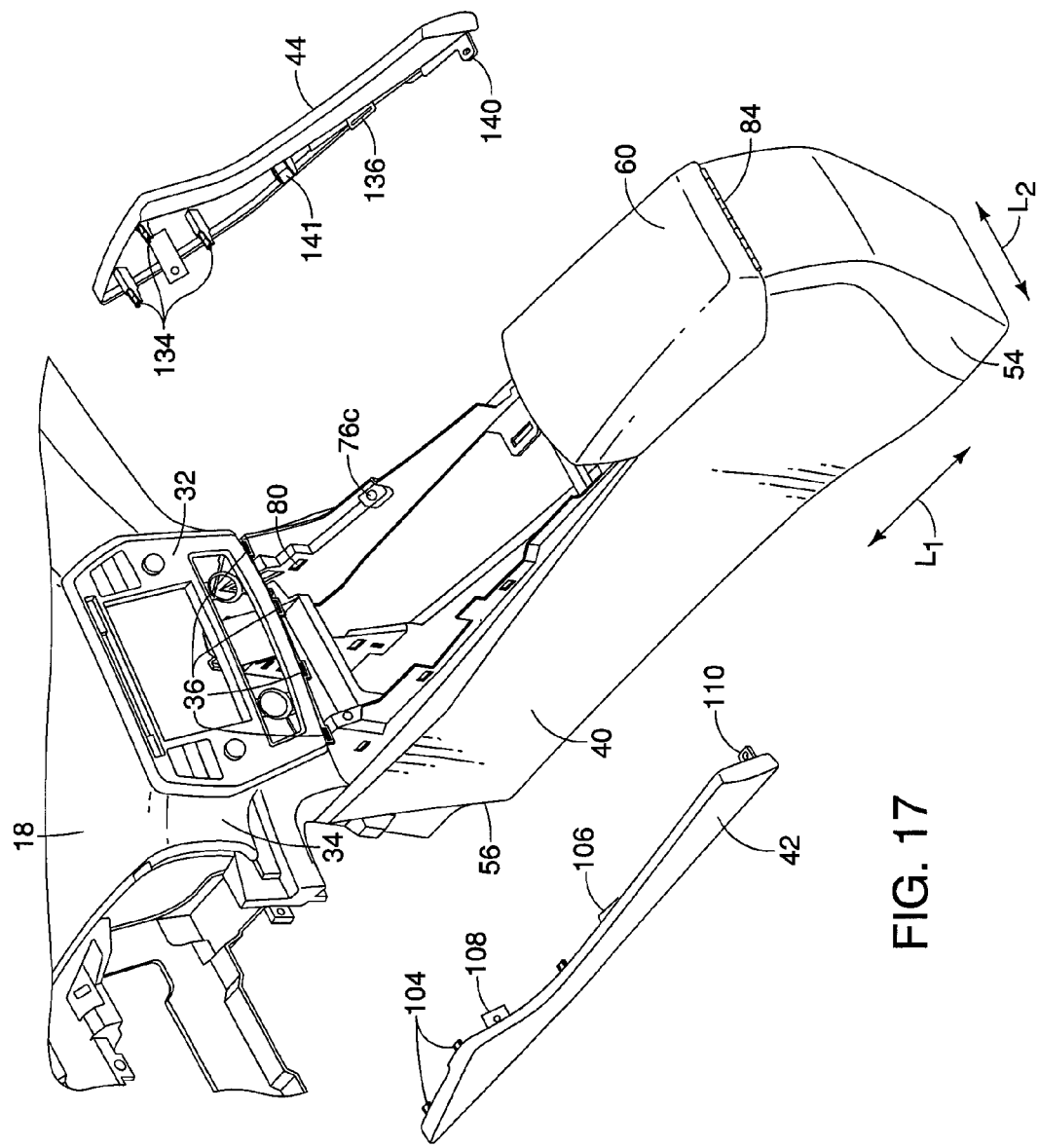
FIG. 17 is a perspective view of the center console assembly showing the center stack trim panel attached to the instrument panel, and the first and second side trim panels being attached to the main body in accordance with the one embodiment.

A description of the assembly process of the interior assembly 12 is now provided with specific reference to FIGS. 17-22. The main body 40 and the instrument panel 18 are installed within the vehicle 10 in a conventional manner with mechanical fasteners (not shown). Thereafter, the center stack trim panel 32 is installed to the instrument panel 18 and attached thereto via the snap fitting projections 34 (FIG. 3). The attachment projections 36 extend downward from the center stack trim panel 32 and are exposed in the absence of the top finisher panel 46, as shown in FIG. 17.

Next, the first side trim panel 42 and the second side trim panel 44 are installed to the main body 40 prior to installation of the top finisher panel 46. The first side trim panel 42 attaches to the upper flange 66 of the first side 50 of the main body 40. More specifically, the lower edge 98 of the first side trim panel 42 is shaped and dimensioned to align with the transition portion 68 and cover the upper flange 66 of the first side 50 of the main body 40. However, when attached to the main body 40, the upper edge 100 of the first side trim panel 42 is located above the upper flange 66 of the main body 40. Further, the first projections 106 are also located above the upper flange 66 of the main body 40 with the first side trim panel 42 installed to the main body 40.

Figure 18:
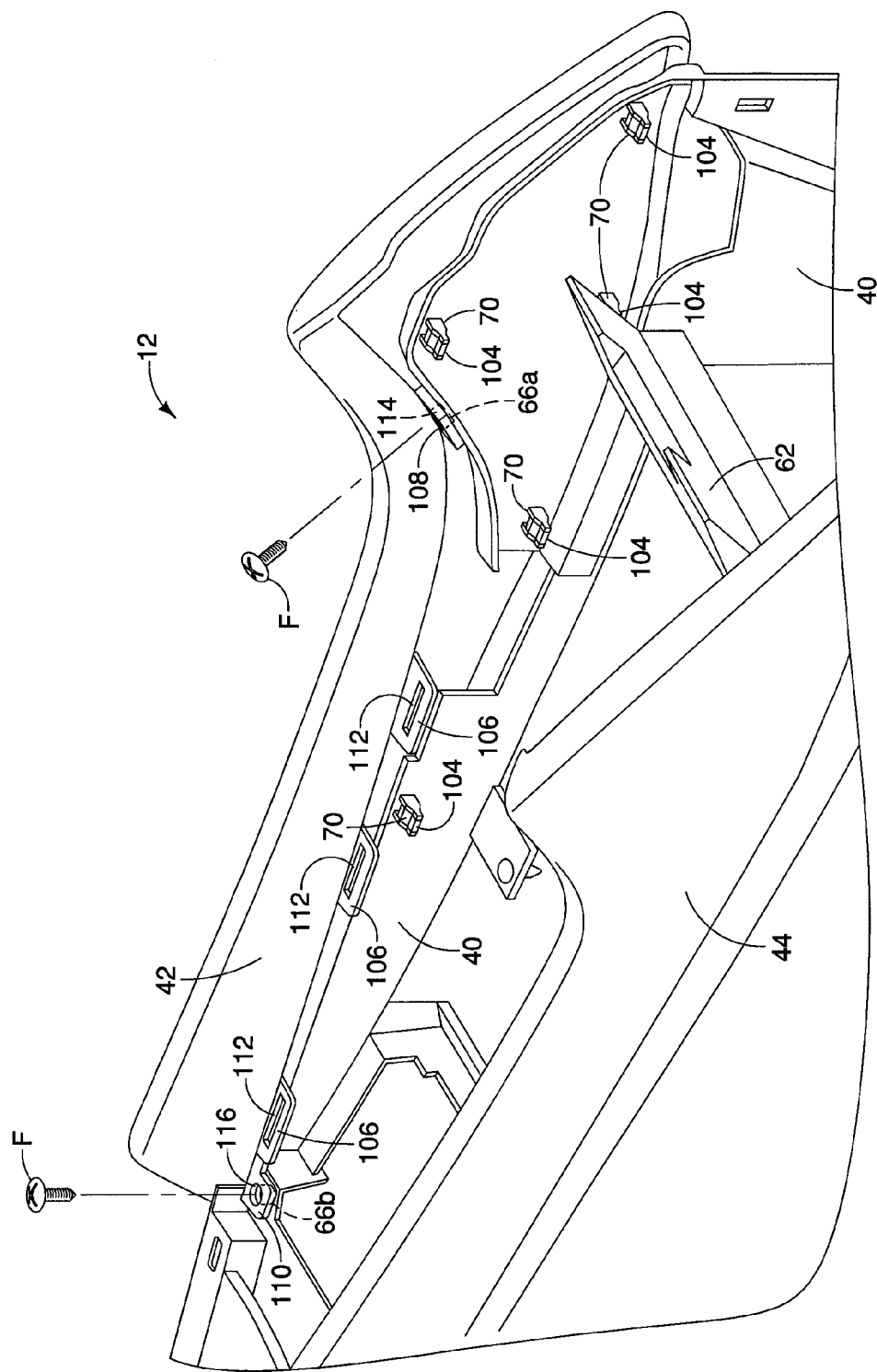
FIG. 18 is a perspective view of the center console showing the first side trim panel installed to the first side of the center console with the projections of the first side trim panel extending through slots in the upper flange of the first side of the main body and fasteners being installed through apertures of the attachment portions of the first side trim panel into apertures in the main body in accordance with the one embodiment.

When the first side trim panel 42 is installed to the upper flange 66, the snap fitting projections at distal ends of the first panel attachment portions 104 are inserted into the slots that define the first side attachment portions 70, as shown in FIG. 18. The aperture 114 in the front attachment flange 108 aligns with the first fastener receiving aperture 66a of the upper flange 66. A fastener F is inserted through both the aperture 114 and the aperture 66a, as shown in FIG. 18, fixing the front end 42a to the main body 40. Further, the aperture 116 in the rear attachment flange 110 aligns with the second fastener receiving aperture 66b of the upper flange 66. A fastener F is inserted through both the aperture 116 and the aperture 66b, as indicated in FIG. 18, fixing the rear end 42b to the main body 40.

During installation, the second side trim panel 44 attaches to the upper flange 76 of the second side 52 of the main body 40. More specifically, the lower edge 128 of the second side trim panel 44 is shaped and dimensioned to align with the transition portion 78 and cover the upper flange 76 of the second side 52 of the main body 40. However, when attached to the main body 40, the upper edge 130 of the second side trim panel 44 is located above the upper flange 76 of the main body 40. Further, the first projections 136 are also located above the upper flange 76 of the main body 40.

Figure 19:
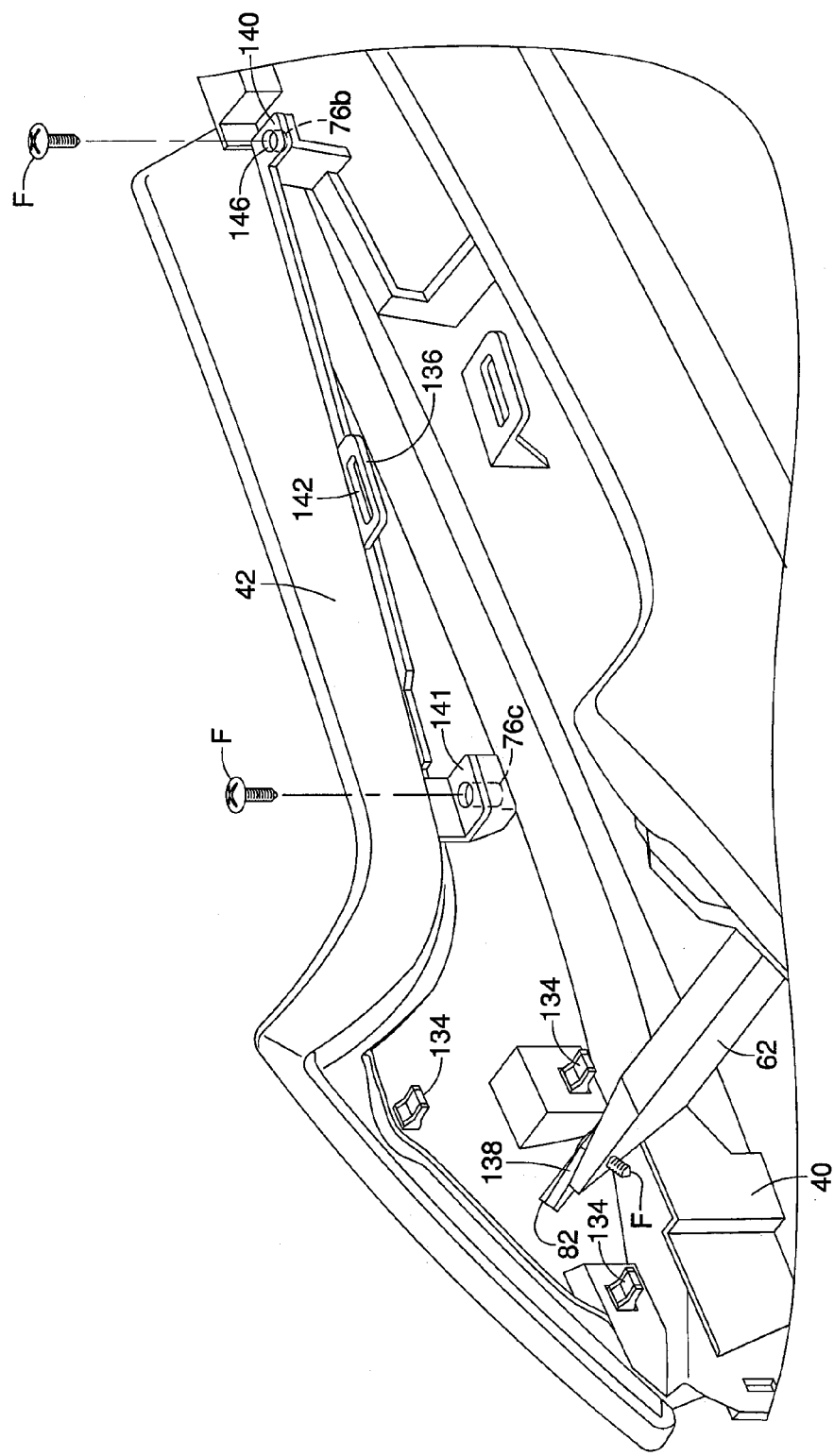
FIG. 19 is another perspective view of the center console showing the second side trim panel installed to the first side of the center console with the projection of the second side trim panel extending through a slot in the upper flange of the second side of the main body and fasteners installed through apertures of the attachment portions of the second side trim panel into apertures in the main body in accordance with the one embodiment.

When the second side trim panel 44 is installed to the upper flange 76, the snap fitting projections at distal ends of the second panel attachment portions 134 are inserted into the slots that define the second side attachment portions 80, as indicated in FIG. 19.

The front attachment flange 138 is inserted into the inclined slot 82 of the upper flange 76 such that the aperture 144 in the front attachment flange 138 aligns with the first fastener receiving aperture 76a of cross brace 62. A fastener F is inserted through both the aperture 144 and the aperture 76a, as shown in FIG. 19, fixing the front end 44a to the main body 40. Further, the aperture 146 in the rear attachment flange 140 aligns with the second fastener receiving aperture 76b of the upper flange 76. A fastener F is inserted through both the aperture 146 and the aperture 76b, as indicated in FIG. 19, fixing the rear end 44b to the main body 40.

As shown in FIG. 18, the slots 112 of the projections 106 of the first side trim panel 42 are exposed in order to receive the first side snap-fitting projections 162 of the top finisher panel 46, as described below. As shown in FIG. 19, the slot 142 of the projection 136 of the second side trim panel 44 is exposed in order to receive the second side snap-fitting projection 164 of the top finisher panel 46, as described below.

Figure 20:
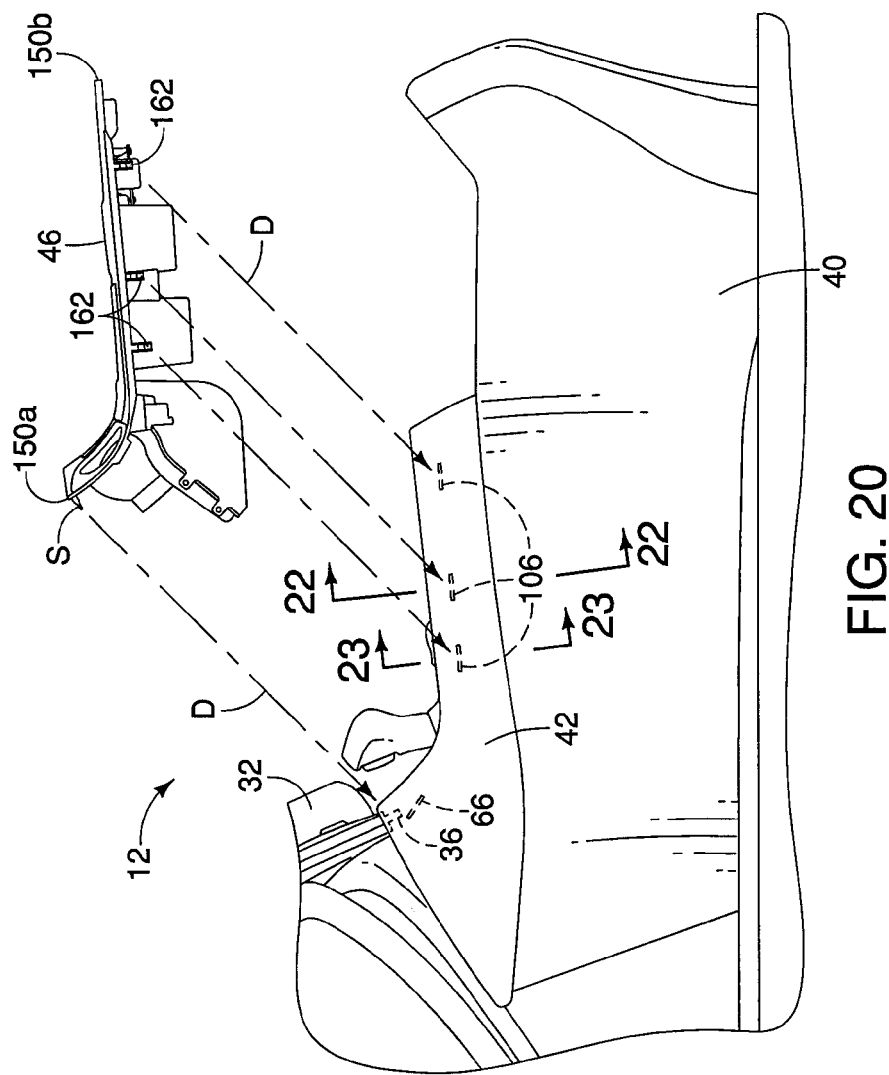
FIG. 20 is a side view of the center console assembly showing the top finisher panel being installed to the center stack trim panel and the projections being installed to slots in the projections of the first and second side trim panels in accordance with the one embodiment.

FIG. 20 depicts the installation of the top finisher panel 46. In the embodiment where the snap-fitting projections S of the top finisher panel 46 are installed to the attachment projections 36 of the center stack trim panel 32, the top finisher panel 46 is installed with movement in a direction as indicated by the arrows D in FIGS. 18-20. The arrow D is inclined by approximately the angle α, as discussed above with respect to the inclination of the snap-fitting projections S of the top finisher panel 46. More specifically, when the top finisher 46 is installed, the snap-fitting projections S are inserted into the apertures 38 of the attachment projections 36 of the center stack trim panel 32. Since the snap-fitting projections S of the top finisher panel 46 and the attachment projections 36 of the center stack trim panel 32 are inclined, the angle of installation of the top finisher panel 46 must similarly be inclined.

Figure 21:
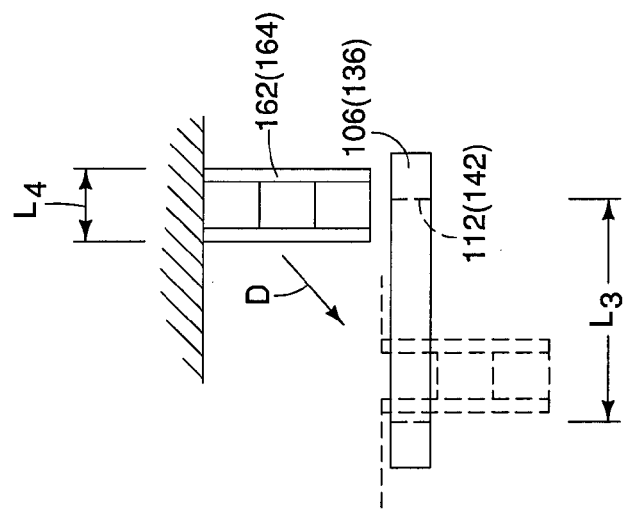
FIG. 21 is a schematic view of the snap fitting projections of the top finisher panel being installed into the slots in the projections of the first and second side trim panels in accordance with the one embodiment.

As the top finisher panel 46 is installed, the first side snap-fitting projections 162 align with and insert into the slots 112 of the first projections 106 of the first side trim panel 42, as indicated in FIG. 21. Further, the second side snap-fitting projection 164 must align with and insert into the slot 142 of the projections 136 of the second side trim panel 44. Since the slots 112 and 142 have a length $L_3$ that is greater than the corresponding width $L_4$ of the projections 106 and 136 of the first and second side trim panels 42 and 44, respectively, the first side snap-fitting projections 162 and the second side snap-fitting projection 164 can slide downward and forward simultaneously as the snap-fitting projections S snap into the apertures 38 of the attachment projections 36 of the center stack trim panel 32.

Figure 23:
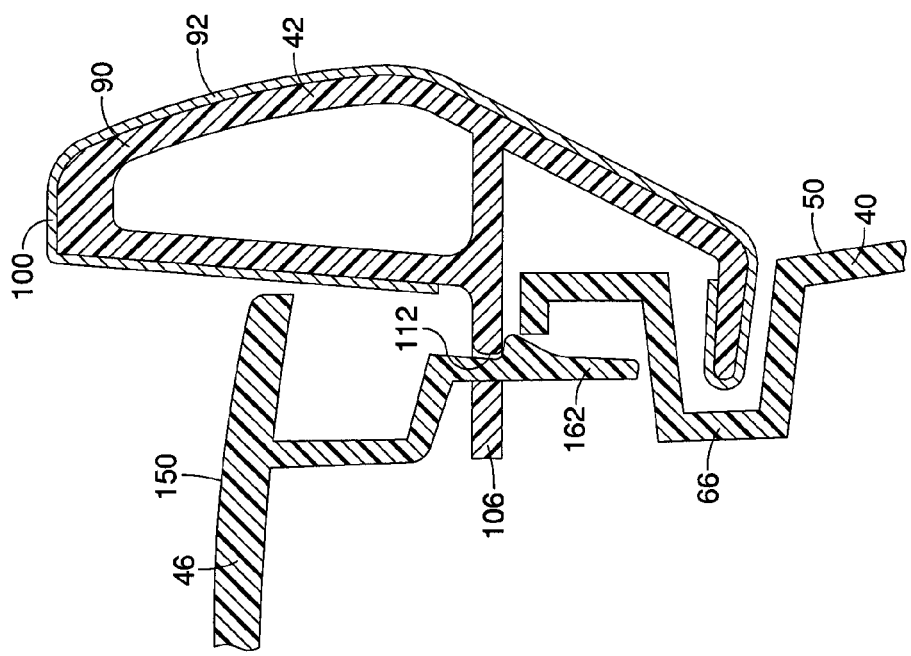
FIG. 23 is another schematic cross-sectional view of another portion of the center console assembly taken along the line 23-23 in FIG. 20 showing another example of one of the projections of the top finisher panel installed in the slot of one of the projections of the first side trim panel in accordance with the one embodiment.
Figure 22:
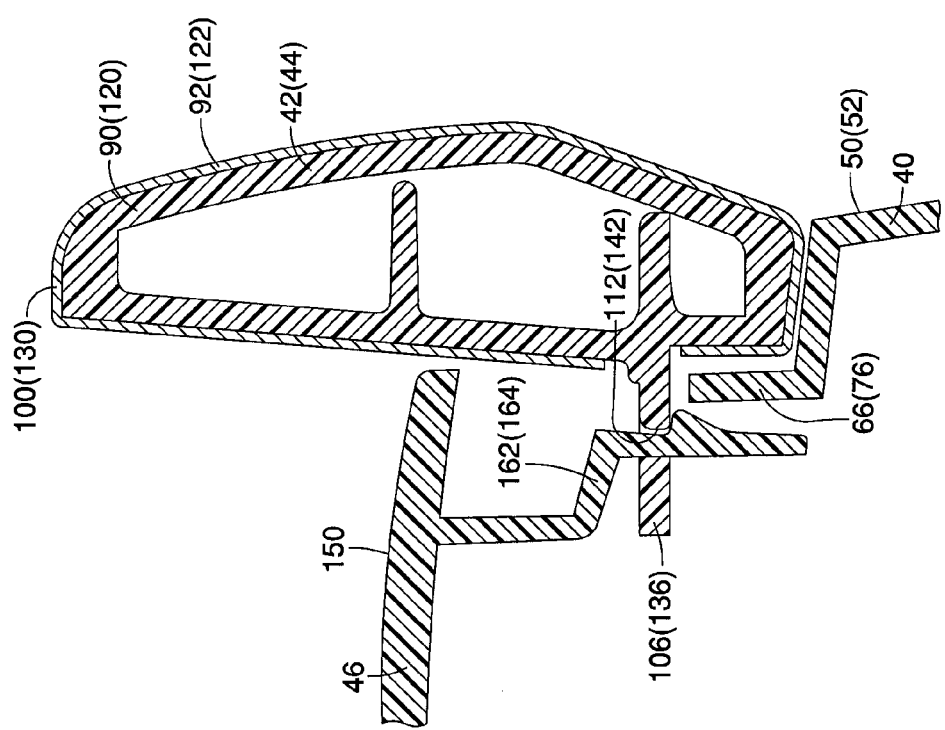
FIG. 22 is a schematic cross-sectional view of a portion of the center console assembly taken along the line 22-22 in FIG. 20 showing an example of one of the projections of the top finisher panel installed in the slot of one of the projections of the first side trim panel (and the second side trim panel) in accordance with the one embodiment.

Hence, while the snap-fitting projections S are snapping into the apertures 38 of the attachment projections 36 of the center stack trim panel 32, the projections 106 and 136 of the first and second side trim panels 42 and 44 are snapping into respective slots 112 and 142 of the projections 106 and 136 of the first and second side trim panels 42 and 44, as indicated in FIGS. 22 and 23.

It should be understood from the drawings and the description herein that the number of the snap-fitting projections S and the attachment projections 36 of the center stack trim panel 32 can be changed from the number depicted in the drawings depending upon the design and configuration of the interior assembly 12. Further, the number of the projections 106 and 136 (and correspondingly of respective slots 112 and 142) of the first and second side trim panels 42 and 44, and respective first side snap-fitting projections 162 and second side snap-fitting projection 164 of the top finisher panel 46 can also be changed and is not limited to the number depicted in the drawings.

More specifically, the first side trim panel 42 corresponds to a driver's side of the interior assembly 12 (the center console assembly). There is typically more activity on the driver's side of the interior assembly 12 than on the passenger's side. Therefore, in the depicted embodiment, there are more projections 106 than there are projections 136 to ensure secure attachment between the top finisher panel 46 and the first side trim panel 42. Further, as shown in FIG. 3, the arrangement of the center stack assembly 24 is such that the center stack trim panel 32 is angularly offset from the vehicle lateral direction $L_2$. In other words, the center stack trim panel 32 is not parallel to the vehicle lateral direction $L_2$. Consequently, the first side trim panel 42 is slightly longer than the second side trim panel 44. Hence, in the depicted embodiment, there are a greater number of mechanical connections between the first side trim panel 42 and the top finisher panel 46.

However, it should be understood from the drawings and the description herein that the first side trim panel 42 and the second side trim panel 44 can alternatively be identical to one another (mirror images of one another) and upper flange 66 and upper flange 76 of the main body 40 can similarly be identical to one another (but mirror images). More specifically, in an alternative embodiment, the first side trim panel 42 and the second side trim panel 44 can be provided with an identical number of projections (first projections 106 and projection 136) and the top finisher panel 46 can be modified such that there is a plurality of second snap fitting projections 164 equal to the number of the first side snap-fitting projections 162.

Further, as shown in the differing cross-sectional views in FIGS. 22 and 23, the shape and contour of the flanges 66 and 76 can differ along their respective lengths in the vehicle longitudinal direction $L_1$. Specifically, the flanges 66 and 76 can have a flat contour or can have more complex shapes relative to a cross-sectional view.

As shown in FIGS. 1, 22 and 23, when the top finisher panel 46 is installed, at least a portion of the upper surface 150 (a main surface) is located below the upper edge 100 and the upper edge 130 of respective ones of the first and second side trim panels 42 and 44. Hence, activities of passengers and drivers of the vehicle 10 may cause forces to be applied on the upper edge 100 and the upper edge 130 of the first and second side trim panels 42 and 44. Since the first side snap-fitting projections 162 and second side snap-fitting projection 164 of the top finisher panel 46 are inserted in the slots 112 and 142 of the first and second side trim panels 42 and 44, the first and second side trim panels 42 and 44 are more reliably retained to the interior assembly 12. Further, since the top finisher panel 46 basically attaches directly to the first and second side trim panels 42 and 44, overall structure is simplified, since there are fewer attachments between the main body 40 and the top finisher panel 46.

Further, when the interior assembly 12 is fully assembled as shown in FIG. 1, the outboard surface 94 (a main surface) of the first side trim panel 42 and a majority of the upper surface 150 of the top finisher panel 46 extend substantially perpendicular to one another. Similarly, the outboard surface 124 (a main surface) of the second side trim panel 44 and the majority of the upper surface 150 of the top finisher panel 46 similarly extend substantially perpendicular to one another.

In the depicted embodiment, the top finisher panel 46 is attached to the first and second side trim panels 42 and 44, but not to the main body 40. It should be understood from the drawings and description herein that the top finisher panel 46 can include additional snap-fitting projections and/or mechanical fastening features such that the top finisher panel 46 also attaches to the main body 40.

The various elements and features of the passenger compartment 14 of the vehicle 10 that were not described above are conventional components that are well known in the art. Since these elements and features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle interior structure. Accordingly, these terms, as utilized to describe the present invention should be interpreted relative to a vehicle equipped with the vehicle interior structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle interior structure comprising:
a main body having a first side defining a plurality of first side attachment portions;
a first side trim panel at least partially covering the first side of the main body, the first side trim panel having a plurality of first panel attachment portions attached to the first side attachment portions of the main body, and at least one first projection spaced apart from the first panel attachment portions and located adjacent to the upper end of the main body, the at least one first projection having an aperture; and
a top finisher panel covering the upper end of the main body and having at least one downwardly extending second projection that extends into the aperture of the at least one first projection retaining the first side trim panel in position relative to the main body.

2. The vehicle interior structure according to claim 1, wherein
the main body, the first side trim panel and the top finisher at least partially define a vehicle center console assembly.

3. The vehicle interior structure according to claim 1, wherein
the at least one first projection extends in a direction that is substantially perpendicular to an inner surface of the first side trim panel.

4. The vehicle interior structure according to claim 1, wherein
a distal end of the at least one second projection defines a snap-fitting projection.

5. The vehicle interior structure according to claim 1, wherein
the at least one first projection of the first side trim panel includes a plurality of first projections, each of the plurality of first projections having a corresponding aperture, and
the at least one second projection of the top finisher panel includes a plurality of second projections that extend downwardly into corresponding ones of the apertures of the plurality of first projections.

6. The vehicle interior structure according to claim 1, wherein
a main surface of the first side trim panel and a top surface of the top finisher panel extend substantially perpendicular to one another.

7. The vehicle interior structure according to claim 1, wherein
the first side trim panel includes a flexible outer portion and a rigid inner portion, with the flexible outer portion being fixedly attached to the rigid inner portion.

8. The vehicle interior structure according to claim 7, wherein
the first projection of the first side trim panel is integrally formed with the rigid inner portion as a one piece unitary monolithic element.

9. The vehicle interior structure according to claim 1, wherein
the main body has a second side defining a plurality of second side attachment portions,
the vehicle interior structure further comprising:
a second side trim panel at least partially covering the second side of the main body, the second side trim panel having a plurality of second panel attachment portions attached to the second side attachment portions of the main body, and a third projection spaced apart from the second panel attachment portions and located adjacent to the upper end of the main body, the third projection having an aperture, and
the top finisher panel having a downwardly extending fourth projection that extends into the aperture of the third projection retaining the second side trim panel in position relative to the main body.

10. The vehicle interior structure according to claim 9, wherein
the third projection extends in a direction that is substantially perpendicular to an inner surface of the second side trim panel.

11. The vehicle interior structure according to claim 9, wherein
a distal end of the fourth projection defines a snap-fitting projection.

12. The vehicle interior structure according to claim 9, wherein
a main surface of the second side trim panel and a top surface of the top finisher panel extend substantially perpendicular to one another.

13. The vehicle interior structure according to claim 9, further comprising
the second side trim panel includes a flexible outer portion and a rigid inner portion, with the flexible outer portion being fixedly attached to the rigid inner portion.

14. The vehicle interior structure according to claim 13, wherein the third projection of the second side trim panel is integrally formed with the rigid inner portion as a one piece unitary monolithic element.

15. The vehicle interior structure according to claim 13, wherein
the third projection extends in a direction that is substantially perpendicular to a surface of the rigid inner portion that faces the main body.

16. The vehicle interior structure according to claim 1, further comprising:
a center stack trim panel installed to a vehicle instrument panel, the center stack trim panel being in an upright orientation and having at least one downwardly extending projection with a slot defined therein, and
wherein the top finisher panel includes at least one snap-fitting projection extending from proximate a front end thereof, the snap-fitting projection being installed in the slot of the downwardly extending projection of the center stack trim panel.

17. The vehicle interior structure according to claim 16, wherein
the aperture defined by the at least one first projection of the first side trim panel has a first length in a longitudinal direction of the first side trim panel, and the at least one downwardly extending second projection of the top finisher panel has a second length in the longitudinal direction of the first side trim panel that is longer than the first length such that, as the top finisher panel is installed to the center stack trim panel, the at least one downwardly extending second projection slides downward and forward simultaneously within the aperture.

18. The vehicle interior structure according to claim 1, wherein
a front portion of the top finisher panel curves upward and away from an adjacent section of the top finisher panel.

19. The vehicle interior structure according to claim 16, wherein
a front portion of the top finisher panel curves upward and away from an adjacent section of the top finisher panel such that the at least one snap-fitting projection extends away from the top finisher panel at a non-orthogonal angle.

* * * * *